US012756468B2

(12) United States Patent
Al-Banna et al.

(10) Patent No.: US 12,756,468 B2
(45) Date of Patent: Oct. 6, 2026

(54) TRANSFORMING A MULTIPOINT-TO-POINT HFC CABLE NETWORK TO A POINT-TO-POINT HFC NETWORK

(71) Applicant: Charter Communications Operating, LLC, St. Louis, MO (US)

(72) Inventors: Ayham Al-Banna, Irving, TX (US); Matthew J. Petersen, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 340 days.

(21) Appl. No.: 18/351,252

(22) Filed: Jul. 12, 2023

(65) Prior Publication Data

US 2025/0023640 A1 Jan. 16, 2025

(51) Int. Cl.
*H04B 10/2575* (2013.01)

(52) U.S. Cl.
CPC ... *H04B 10/2575* (2013.01); *H04B 10/25751* (2013.01)

(58) Field of Classification Search
CPC ..................................... H04B 10/2575–25759
USPC .................................................. 398/115–117
See application file for complete search history.

(56) References Cited

U.S. PATENT DOCUMENTS 5,802,449 A * 9/1998 Beller .................... H04H 20/79 348/E7.071
9,473,241 B1 * 10/2016 Joffe .................. H04B 10/2575
2002/0136203 A1 * 9/2002 Liva .................... H04L 27/3416 370/465
2004/0045035 A1 * 3/2004 Cummings ......... H04L 12/2801 725/111
2004/0244049 A1 * 12/2004 Hahin ................ H04N 7/17309 725/120
2012/0198510 A1 * 8/2012 Stoneback ........... H04N 21/437 725/129
2014/0119732 A1 * 5/2014 Stoneback ............ H04J 3/0661 398/66
2014/0137177 A1 * 5/2014 Rakib ................ H04N 7/17309 725/129
2014/0282801 A1 * 9/2014 Bowler .................. H04N 21/61 725/129
2015/0280816 A1 * 10/2015 Al-Banna .......... H04B 10/2575 398/26

(Continued)

FOREIGN PATENT DOCUMENTS

KR 100292805 B1 * 6/2001 ....... H04B 10/25752

*Primary Examiner* — Li Liu
(74) *Attorney, Agent, or Firm* — Dority & Manning, P.A.

(57) ABSTRACT

A system that includes a fiber-to-coaxial tap device (FTD) that includes a plurality of coaxial connectors, the coaxial connectors operable to be communicatively coupled to corresponding ones of a plurality of subscriber cable modems via corresponding drop coaxial cables. The FTD further includes a fiber connector operable to be coupled to a fiber node via a fiber cable, and processing circuitry operable to receive, via each coaxial connector of the plurality of coaxial connectors, radio frequency (RF) signals originating from a corresponding originating subscriber cable modem, convert the RF signals to digital packets, wherein each digital packet includes a source address that corresponds to the corresponding originating subscriber cable modem, and transmit the digital packets to the fiber node via optical signals.

15 Claims, 6 Drawing Sheets

(56) References Cited

U.S. PATENT DOCUMENTS

| | | | | |
|---|---|---|---|---|
| 2017/0302378 | A1* | 10/2017 | Mutalik | H04L 12/2856 |
| 2018/0109319 | A1* | 4/2018 | Jones | H04B 10/564 |
| 2019/0393959 | A1* | 12/2019 | Beas Bujanos | H04Q 11/0071 |

* cited by examiner

TRANSFORMING A MULTIPOINT-TO-POINT HFC CABLE NETWORK TO A POINT-TO-POINT HFC NETWORK

BACKGROUND

Hybrid fiber-coaxial (HFC) networks, in the upstream direction, are multipoint-to-point networks. Multiple customer premises equipment (CPE), such as cable modems, connect to a passive device, such as a tap, that combines any signals received from cable modems connected to the tap onto a coaxial distribution cable that is coupled to an upstream aggregation node. Because the tap is a passive device, communications from the cable modems that are coupled to the tap are scheduled such that no two modems are concurrently transmitting information. In the downstream direction, the tap splits the signal received on the distribution coaxial cable and sends the signal to each cable modem coupled to the tap, and each cable modem determines what data is destined for the respective cable modem.

SUMMARY

In one embodiment a system is provided. The system includes a first fiber-to-coaxial tap device (FTD) that includes a first plurality of coaxial connectors, the coaxial connectors operable to be communicatively coupled to corresponding ones of a first plurality of subscriber cable modems via a corresponding plurality of drop coaxial cables. The first FTD further includes a first fiber connector, operable to be coupled to a fiber node via a first fiber cable, and processing circuitry, operable to receive, via each coaxial connector of the first plurality of coaxial connectors, first radio frequency (RF) signals originating from a corresponding originating subscriber cable modem, convert the first RF signals to first digital packets, wherein each first digital packet includes a first source address that corresponds to the corresponding originating subscriber cable modem, and transmit the first digital packets to the fiber node via first optical signals.

In another embodiment a method is provided. The method includes receiving, at a fiber-to-coaxial tap device (FTD) including a plurality of coaxial connectors communicatively coupled to corresponding ones of a plurality of subscriber cable modems via a corresponding plurality of drop coaxial cables, via each coaxial connector of the plurality of coaxial connectors, first radio frequency (RF) signals originating from a corresponding originating subscriber cable modem, wherein the FTD is communicatively coupled to a fiber node via a fiber cable. The method further includes converting the first RF signals to first digital packets, wherein each first digital packet includes a first source address that corresponds to the corresponding originating subscriber cable modem. The method further includes transmitting the first digital packets to the fiber node via optical signals.

In another embodiment another method is provided. The method includes accessing a coaxial tap including a housing that forms an internal volume, a first coaxial connector coupled to an upstream node via a coaxial distribution cable, and a plurality of second coaxial connectors, the second coaxial connectors communicatively coupled to corresponding ones of a plurality of subscriber cable modems via a corresponding plurality of drop coaxial cables. The method further includes installing, in the internal volume, processing circuitry operable to receive, via each drop coaxial cable of the plurality of drop coaxial cables, radio frequency (RF) signals originating from a corresponding subscriber cable modem, convert the RF signals to digital packets, wherein each digital packet includes a source address that corresponds to the corresponding subscriber cable modem, and transmit the digital packets to a fiber node via the fiber cable via optical signals. The method further includes connecting, to the processing circuitry, a fiber cable and the plurality of drop coaxial cables.

In another embodiment another method is provided. The method includes locating a coaxial tap including a housing, a first coaxial connector coupled to an upstream node via a coaxial distribution cable, and a plurality of second coaxial connectors, the second coaxial connectors communicatively coupled to corresponding ones of a plurality of subscriber cable modems via a corresponding plurality of drop coaxial cables. The method further includes disconnecting the drop coaxial cables from the second coaxial connectors. The method further includes replacing the coaxial tap with a fiber-to-coaxial tap device (FTD) that includes a plurality of third coaxial connectors and a fiber connector operable to be coupled to a fiber node via a fiber cable. The method further includes connecting the drop coaxial cables to the plurality of third coaxial connectors and connecting the fiber cable to the fiber connector.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
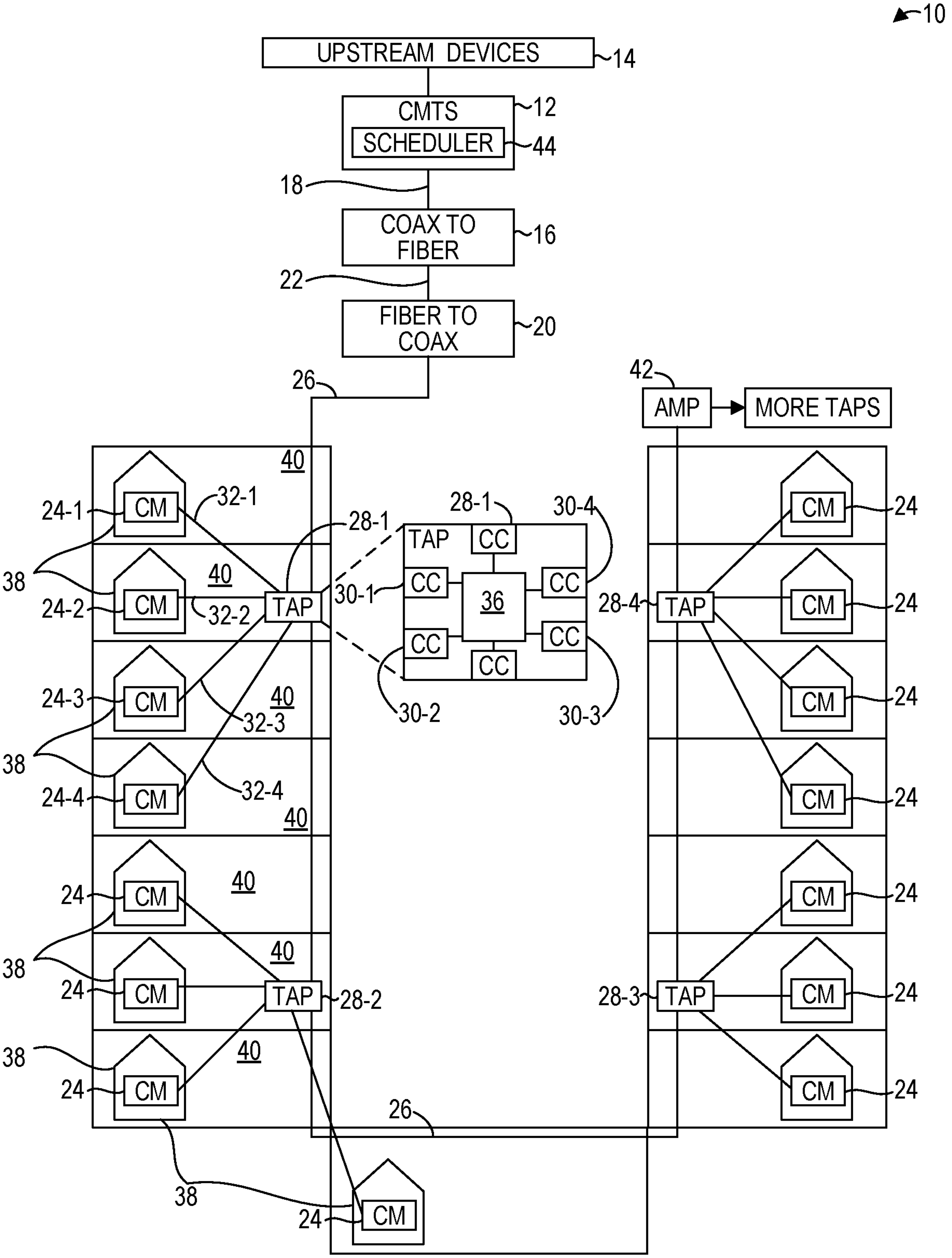
FIG. 1 is a block diagram of a conventional hybrid fiber-coaxial (HFC) network.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first message” and “second message,” and does not imply an initial occurrence, a quantity, a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word “or” as used herein and in the claims is inclusive unless contextually impossible. As an example, the recitation of A or B means A, or B, or both A and B. The word “data” may be used herein in the singular or plural depending on the context. The use of “and/or” between a phrase A and a phrase B, such as “A and/or B” means A alone, B alone, or A and B together.

Hybrid fiber-coaxial (HFC) networks, in the upstream direction, are multipoint-to-point networks. Multiple customer premises equipment (CPE), such as cable modems, connect to a passive device, such as a tap, which combines any signals received from cable modems connected to the tap onto a coaxial distribution cable that is coupled to an upstream aggregation node. Because the tap is a passive device, communications from the cable modems that are coupled to the tap are scheduled such that no two modems are concurrently transmitting information. In the downstream direction, the tap splits the signal received on the distribution coaxial cable and sends the signal to each cable modem coupled to the tap, and each cable modem determines what data is destined for the respective cable modem.

The embodiments disclosed herein transform a multipoint-to-point HFC network into a point-to-point HFC network using existing coaxial drop cables that extend between a subscriber's cable modem and a tap, eliminating the tree-and-branch architecture of a conventional HFC network. In particular, the passive tap currently used to combine transmissions from multiple subscriber cable modems is replaced with a fiber-to-coaxial tap device (FTD) that implements functionality similar to a Remote PHY device (RPD) that converts radio frequency (RF) signals received from the subscriber cable modems to packetized data, and sends the packetized data to a fiber node via a fiber cable. The FTD receives packetized data from the fiber node destined for the subscriber cable modems, converts the packetized data to RF signals, and sends the RF signals to the appropriate subscriber cable modems. Because the FTD has separate connections to each subscriber cable modem and packetizes the RF signals received from the subscriber cable modems, the subscriber cable modems can transmit data concurrently and no longer need to wait for specific time and/or frequency slots in which to send data. Similarly, the communications from the fiber node no longer need to be scheduled in particular time and/or frequency slots because the FTD receives digital packets that identify a destination cable modem, and the FTD can convert the data to RF signals and send the RF signals to the particular cable modem to which the packet is addressed.

Among other advantages, the disclosed point-to-point HFC network eliminates losses introduced by RF splitters and amplifiers that would otherwise be necessary in an HFC network, and provides a point-to-point network from the cable modem termination system (CMTS) to each subscriber cable modem, greatly increasing the bandwidth available to the subscriber cable modem without incurring the relatively high costs of installing fiber cables directly to each subscriber's home.

FIG. 1 is a block diagram of a conventional hybrid fiber-coaxial (HFC) network 10. The network 10 includes a cable modem termination system (CMTS) 12 that is in communication with upstream devices 14, such as, by way of non-limiting example, servers in a service provider's network, external content servers, and the like. The CMTS 12 is coupled to a coax-to-fiber device 16 via a coaxial cable 18. The coax-to-fiber device 16 converts RF signals to optical signals and communicates the optical signals over some distance to a fiber-to-coaxial device 20 via a fiber cable 22. The fiber-to-coaxial device 20 sends RF signals carrying data received from the CMTS 12 to a plurality of cable modems 24, 24-1-24-4 via a distribution coaxial cable 26, sometimes referred to as a hardline.

The distribution coaxial cable 26 is coupled to a plurality of taps 28-1-28-4 (generally, taps 28). The tap 28-1 includes a plurality of coaxial connectors 30-1-30-4 that are coupled to drop coaxial cables 32-1-32-4 that are in turn connected to corresponding subscriber cable modems 24-1-24-4. The tap 28-1 includes passive (i.e., unpowered) circuitry 36 that is operable to split a downstream RF signal received from the fiber-to-coaxial device 20 and direct the signal to each of the subscriber cable modems 24-1-24-4 via the drop coaxial cables 32-1-32-4. The circuitry 36 is also operable to receive any RF signals originating from a subscriber cable modem 24-1-24-4 via the corresponding drop coaxial cable 32-1-32-4 and combine the RF signals onto the distribution coaxial cable 26. At some point along the distribution coaxial cable 26, an amplifier 42 may be inserted to ensure sufficient signal strength for additional downstream taps 28.

The subscriber cable modems 24 are typically located in residential or business premises 38 located on corresponding parcels of land 40. One or more of the taps 28 may be located on one of the parcels of land 40 containing a premises 38 served by the respective tap 28. The drop coaxial cables 32 are typically relatively short runs of coaxial cable, such as 50 feet, 100 feet, 200 feet, or the like. The drop coaxial cables 32 may extend between a corresponding subscriber cable modem 24 and the tap 28 without any amplifiers or other splitters between the corresponding subscriber cable modem 24 and the tap 28.

It is noted that for purposes of illustration only a single distribution coaxial cable 26 is illustrated, but in practice the fiber-to-coaxial device 20 may be connected to any number of distribution coaxial cables 26, and the CMTS 12 may be coupled to any number of fiber-to-coaxial devices 20. Moreover, there may be any number of CMTSs 12, and the number of subscriber cable modems 24 may number in the millions.

Because the taps 28 are passive devices that simply combine signals received from the cable modems 24 onto the distribution coaxial cable 26, concurrent transmissions in time or frequency from two or more cable modems will collide corrupting the individual transmissions. To prevent collisions, the CMTS 12 includes a scheduler 44 that provides each cable modem 24 time and/or frequency slots in which RF data will be provided to the cable modem 24 and time and/or frequency slots in which the cable modem 24 can send RF data to the CMTS 12. The taps 28-2-28-4 are configured identically or substantially similarly as the tap 28-1 and provide identical or substantially similar functionality to corresponding cable modems 24 as described above with regard to the tap 28-1.

Figure 2:
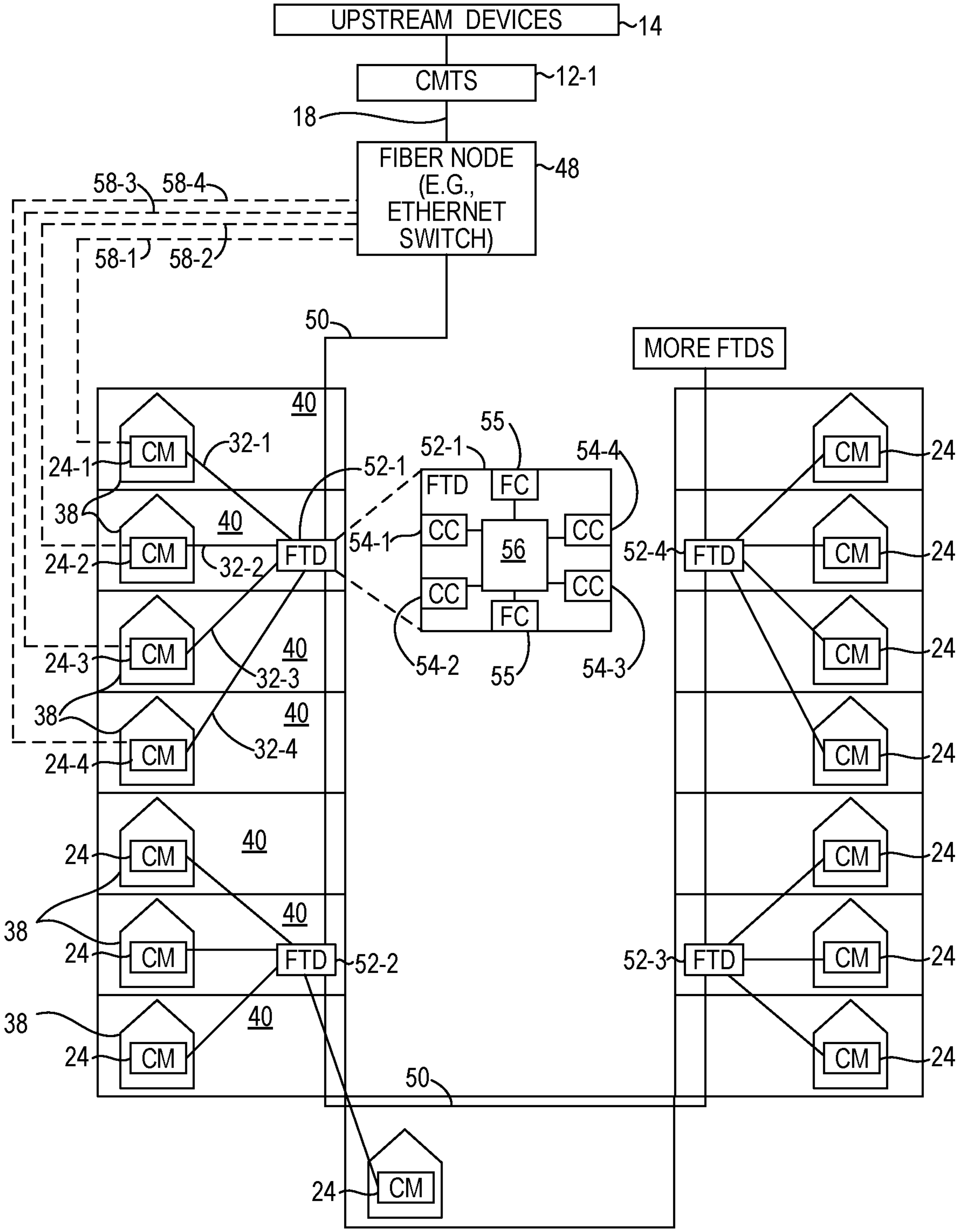
FIG. 2 is a block diagram of an HFC network according to one embodiment.

FIG. 2 is a block diagram of an HFC network 46 according to one embodiment. The network 46 includes a fiber node 48, such as an Ethernet switch, that communicates with a CMTS 12-1. A fiber cable 50 including one or more strands of fiber extends from the fiber node 48 and connects to a plurality of fiber-to-coaxial tap devices (FTDs) 52-1-52-4

(generally, FTDs 52). The FTD 52-1 includes a plurality of coaxial connectors 54-1-54-4 that are operable to be communicatively coupled to corresponding ones of the plurality of subscriber cable modems 24-1-24-4 via the corresponding drop coaxial cables 32-1-32-4. The FTD 52-1 includes at least one fiber connector 55 operable to be coupled to the fiber node 48 via the fiber cable 50. In this example, the FTD 52-1 includes two fiber connectors 55 so that the fiber cable 50 can be connected to the FTD 52-2.

The FTD 52-1 includes powered circuitry 56 that includes a processor device and a memory, and is operable to receive, via each coaxial connector 54, RF signals originating from a corresponding subscriber cable modem 24, convert the RF signals to digital packets, wherein each digital packet includes a source address that corresponds to the corresponding originating subscriber cable modem 24, and transmit the digital packets to the fiber node 48 via optical signals. The term "digital" as used herein refers to binary data that is communicated by two different states, such as two different signal levels. The RF signals may include packets that contain the source address.

The powered circuitry 56 is operable to receive a digital packet from the fiber node 48 addressed to a subscriber cable modem 24 of the plurality of subscriber cable modems 24-1-24-4 connected to the FTD 52-1, convert the digital packet to RF signals, and transmit the RF signals to the subscriber cable modem 24 based on the destination address identified in the packet. Notably, the powered circuitry 56 sends the RF signals only to the subscriber cable modem 24 of the plurality of subscriber cable modems 24-1-24-4 to which the packet is addressed.

It is noted that, while the powered circuitry 56 is, solely for purposes of illustration, illustrated separately from the fiber connectors 55 and the coaxial connectors 54, in some embodiments, the powered circuitry 56 is integrated with the fiber connectors 55 and the coaxial connectors 54, such as on a printed circuit board or the like.

The powered circuitry 56 may include, by way of non-limiting example, downstream quadrature amplitude modulation (QAM) and orthogonal frequency-division multiplexing (OFDM) modulators, upstream QAM and OFDM demodulators, and pseudowire logic used to connect to a Converged Cable Access Platform (CCAP) Core. The powered circuitry 56 may be operable to convert downstream DOCSIS data, MPEG video, and out-of-band (OOB) signals received from a CCAP Core over a digital fiber network such as Ethernet or passive optical network (PON) to analog RF for transmission over the coaxial cable; and to convert upstream RF, DOCSIS, and OOB signals received over the coaxial cable to digital for transmission over Ethernet or PON to a CCAP Core.

The FTD 52-1 may be located on one of the parcels of land 40 of the plurality of parcels of land 40 containing a premises 38 served by the FTD 52-1. Because the FTD 52-1 processes the connections with the subscriber cable modems 24-1-24-4 independent of one another and converts all RF signals received from the subscriber cable modems 24-1-24-4 to digitized packets, each of the subscriber cable modems 24-1-24-4 can transmit RF signals to the FTD 52-1 concurrently with the other subscriber cable modems 24-1-24-4 without fear of collisions. Thus, each of the subscriber cable modems 24-1-24-4 can communicate concurrently and independently with the fiber node 48 thus establishing point-to-point connections 58-1-58-4 between the subscriber cable modems 24-1-24-4 and the fiber node 48 via the FTD 52-1. Moreover, because the subscriber cable modems 24-1-24-4 can communicate concurrently and independently with the fiber node 48, the CMTS 12-1 does not need a scheduler in order to ensure that the subscriber cable modems 24-1-24-4 schedule transmissions in dedicated time and/or frequency slots to avoid collisions.

In some embodiments, the FTD 52-1 includes a plurality of fiber connectors 55 equal in number to the number of coaxial connectors 54, each fiber connector 55 being operable to be coupled to an individual strand of fiber of the fiber cable 50. The powered circuitry 56 is operable to utilize, for each respective subscriber cable modem 24-1-24-4, a particular fiber strand for all communications originating from or destined to the respective subscriber cable modem 24-1-24-4.

In some embodiments, the powered circuitry 56 is operable to transmit digital packets from different cable modems 24 to the fiber node 48 on a single strand of fiber concurrently using different wavelengths that correspond to the subscriber cable modems 24-1-24-4. In some embodiments, the powered circuitry 56 may send the generated digital packets to the fiber node 48 on a single wavelength on a single strand of fiber.

In some embodiments, the FTD 52-1 includes a device that complies with a DOCSIS 3.0, DOCSIS 3.1, or DOCSIS 4.0 specification. The drop coaxial cables 32-1-32-4 may extend between the corresponding cable modem 24-1-24-4 and the FTD 52-1 without any amplifiers or other splitters between the corresponding cable modem 24 and the FTD 52-1.

The FTDs 52-2-52-4 are configured identically or substantially similarly as the FTD 52-1 and provide identical or substantially similar functionality to corresponding cable modems 24 as described above with regard to the FTD 52-1.

Figure 3:
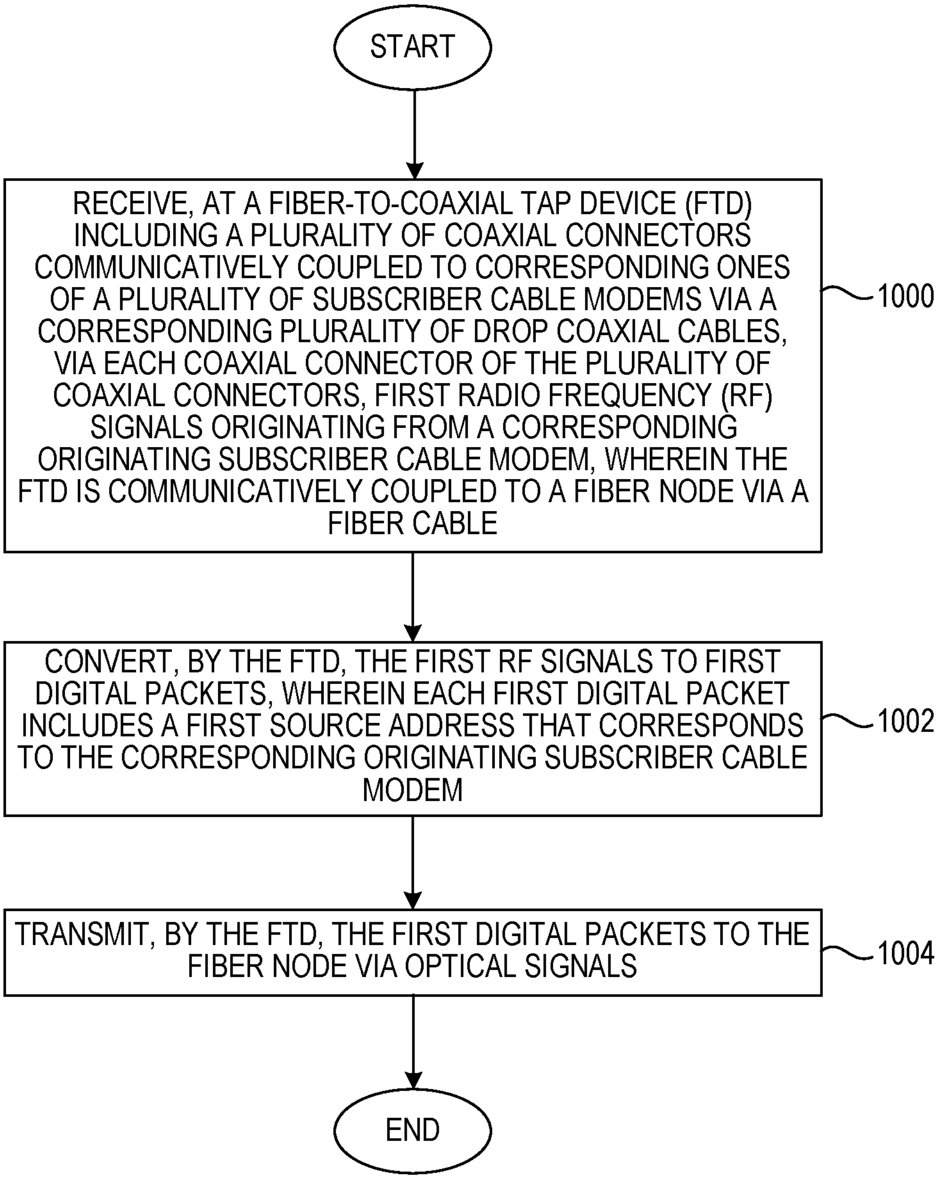
FIG. 3 is a flowchart of a method for transforming a multipoint-to-point HFC cable network to a point-to-point HFC network according to one embodiment.

FIG. 3 is a flowchart of a method for transforming a multipoint-to-point HFC cable network to a point-to-point HFC network according to one embodiment. FIG. 3 will be discussed in conjunction with FIG. 2. The FTD 52-1, including the plurality of coaxial connectors 54-1-54-4 communicatively coupled to the corresponding ones of a plurality of subscriber cable modems 24-1-24-4 via the corresponding plurality of drop coaxial cables 32-1-32-4, receives RF signals originating from the corresponding subscriber cable modems 24-1-24-4 via each coaxial connector 54 of the plurality of coaxial connectors 54-1-54-4, wherein the FTD 52-1 is communicatively coupled to the fiber node 48 via the fiber cable 50 (FIG. 3, block 1000). The FTD 52-1 converts the RF signals to digital packets, wherein each digital packet includes a source address that corresponds to the corresponding originating subscriber cable modem 24-1-24-4 (FIG. 3, block 1002). The FTD 52-1 transmits the digital packets to the fiber node 48 via optical signals (FIG. 3, block 1004).

Referring again to FIGS. 1 and 2, in some embodiments, the multipoint-to-point HFC cable network illustrated in FIG. 1 can be transformed into the point-to-point HFC illustrated in FIG. 2 in part by modifying the existing taps 28-1-28-4. In particular, a technician can access the coaxial tap 28-1. The coaxial tap 28-1 includes a sealed housing that forms an internal volume in which the circuitry 36 resides. The technician opens the housing, removes the circuitry 36 from the housing, and inserts the powered circuitry 56 into the housing. The technician connects the drop coaxial cables 32-1-32-4 to the powered circuitry 56. The technician may also retain the connection to the distribution coaxial cable 26 for purposes of powering the powered circuitry 56. The technician connects the fiber cable 50 to the powered circuitry 56. This process may be repeated at the taps 28-2-28-4.

Figure 4:
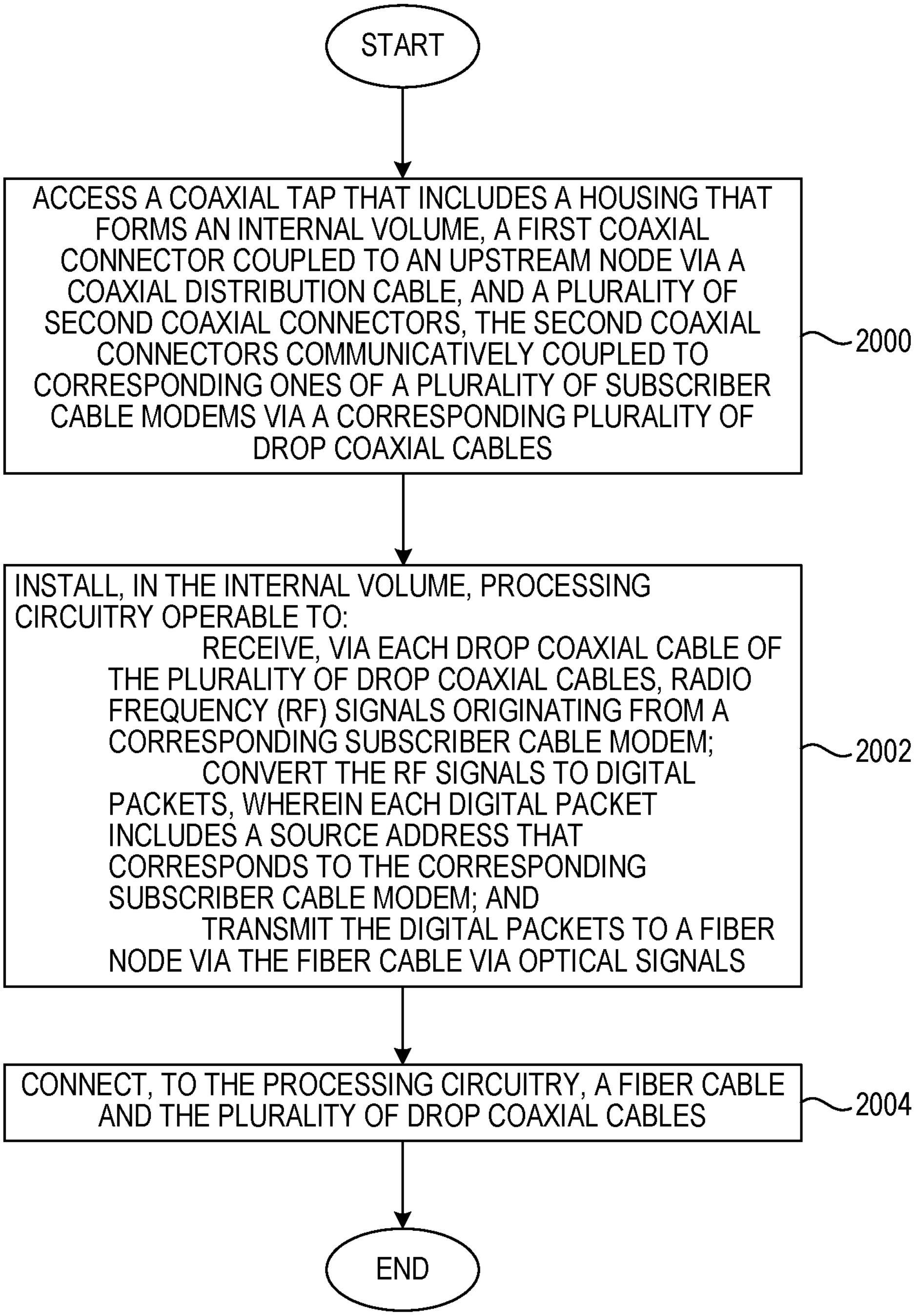
FIG. 4 is a flowchart of a method for transforming an existing tap into a fiber-to-coaxial tap device (FTD) according to one embodiment.

FIG. 4 is a flowchart of a method for transforming an existing tap 28 into an FTD 52 according to one embodiment. FIG. 4 will be discussed in conjunction with FIGS. 1 and 2. A technician accesses the coaxial tap 28-1 that includes a housing that forms an internal volume, the coaxial connector 30-1 coupled to the fiber to coaxial device 20 via the distribution coaxial cable 26 and the plurality of coaxial connectors 30-1-30-4, the coaxial connectors 30-1-30-4 communicatively coupled to corresponding ones of the plurality of subscriber cable modems 24-1-24-4 via the corresponding drop coaxial cables 32-1-32-4 (FIG. 4, block 2000). The technician installs, in the internal volume, processing circuitry operable to receive, via each drop coaxial cable 32-1-32-4 of the plurality of drop coaxial cables 32-1-32-4, RF signals originating from a corresponding subscriber cable modem 24-1-24-4, convert the RF signals to digital packets, wherein each digital packet includes a source address that corresponds to the corresponding subscriber cable modem 24-1-24-4, and transmit the digital packets to the fiber node 48 via the fiber cable 50 via optical signals (FIG. 4, block 2002). The technician connects, to the powered circuitry 56, the fiber cable 50 and the plurality of drop coaxial cables 32-1-32-4 (FIG. 4, block 2004).

Figure 5:
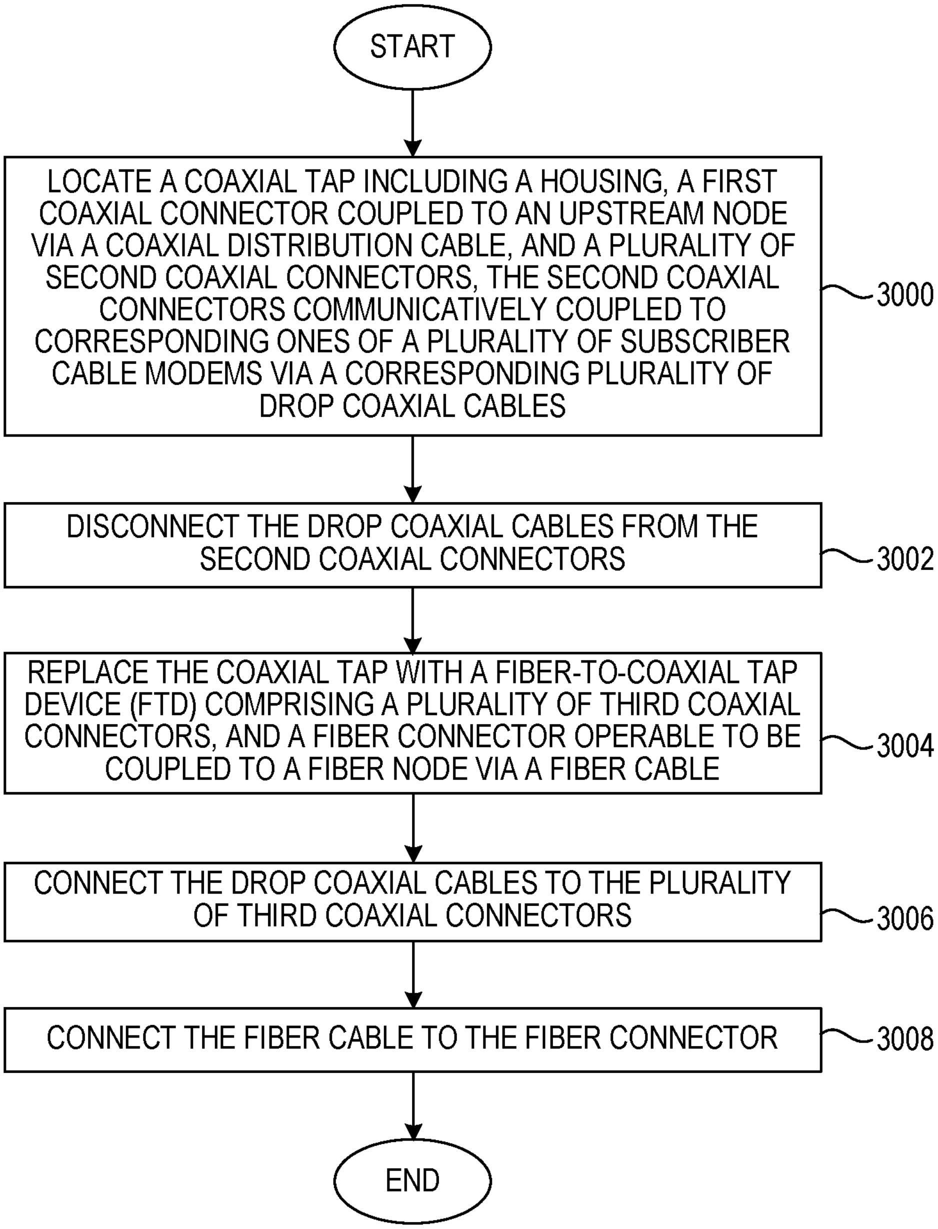
FIG. 5 is a flowchart of a method for replacing a tap with an FTD according to one embodiment.

FIG. 5 is a flowchart of a method for replacing a tap 28 with an FTD 52 according to one embodiment. FIG. 5 will be discussed in conjunction with FIGS. 1 and 2. A technician locates the coaxial tap 28-1 that includes a housing, the coaxial connector 28-1 coupled to the fiber to coaxial device 20 via the distribution coaxial cable 26, and the coaxial connectors 30-1-30-4 communicatively coupled to corresponding ones of the plurality of subscriber cable modems 24-1-24-4 via the corresponding plurality of drop coaxial cables 32-1-32-4 (FIG. 5, block 3000). The technician disconnects the drop coaxial cables 32-1-32-4 from the coaxial connectors 30-1-30-4 (FIG. 5, block 3002). The technician replaces the coaxial tap 28-1 with the FTD 52-1 that includes the plurality of coaxial connectors 54-1-54-4 and the fiber connector 55 operable to be coupled to the fiber node 48 via the fiber cable 50 (FIG. 5, block 3004). The technician connects the drop coaxial cables 32-1-32-4 to the plurality of coaxial connectors 54-1-54-4 (FIG. 5, block 3006). The technician connects the fiber cable 50 to the fiber connector 55 (FIG. 5, block 3008).

Figure 6:
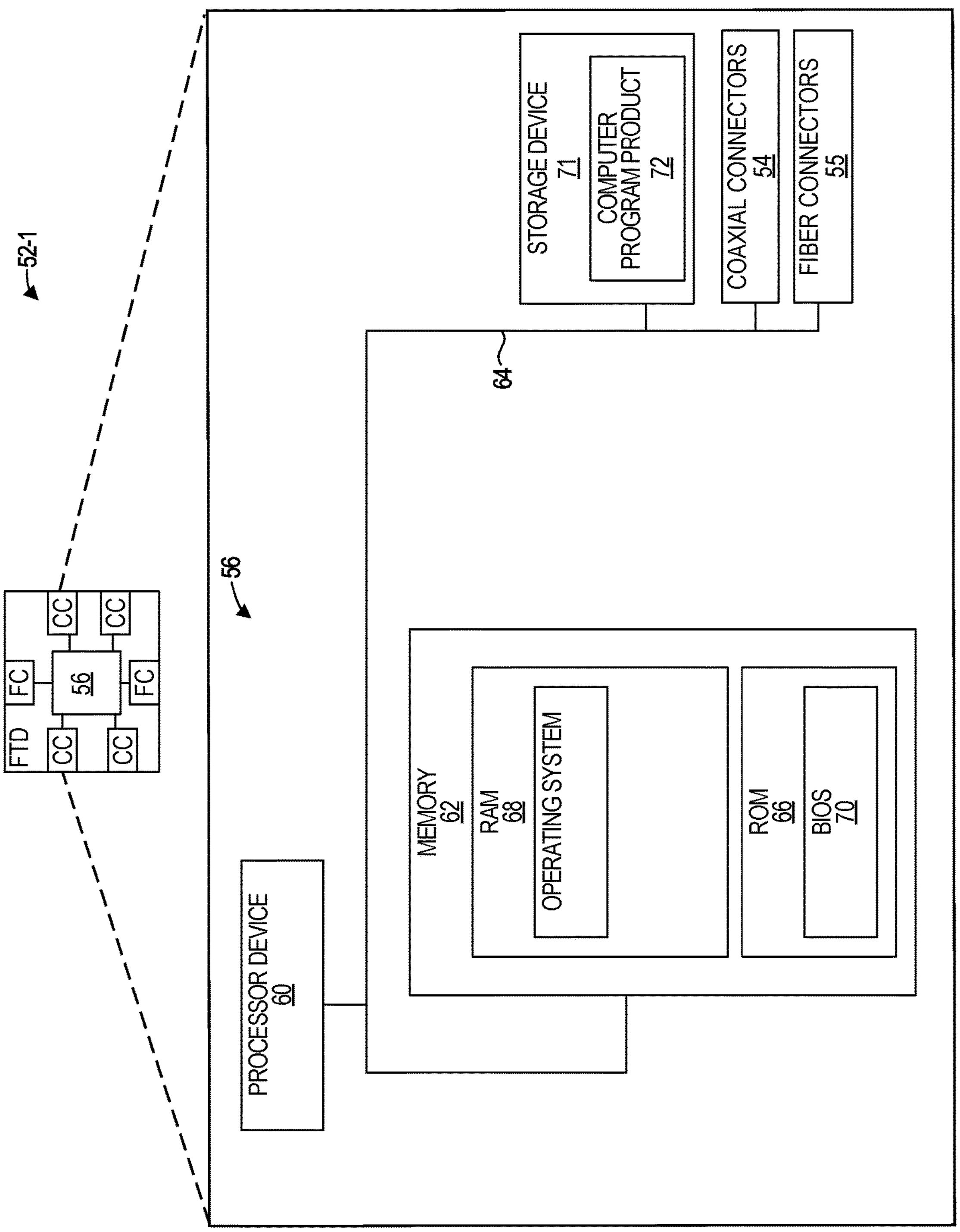
FIG. 6 is a block diagram of an FTD suitable for implementing embodiments disclosed herein.

FIG. 6 is a block diagram of the FTD 52-1 suitable for implementing examples according to one example. The FTD 52-1 includes the powered circuitry 56 which may include a processor device 60, a system memory 62, and a system bus 64. The system bus 64 provides an interface for system components including, but not limited to, the system memory 62 and the processor device 60. The processor device 60 can be any commercially available or proprietary processor device.

The system bus 64 may be any of several types of bus structures that may further interconnect to a memory bus (with or without a memory controller), a peripheral bus, and/or a local bus using any of a variety of commercially available bus architectures. The system memory 62 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the FTD 52-1. The volatile memory 68 may also include a high-speed RAM, such as static RAM, for caching data.

The FTD 52-1 may further include or be coupled to a non-transitory computer-readable storage medium such as a storage device 71, which may comprise, for example, an internal hard disk drive (HDD) (e.g., enhanced integrated drive electronics (EIDE) or serial advanced technology attachment (SATA)), HDD (e.g., EIDE or SATA) for storage, flash memory, or the like. The storage device 71 and other drives associated with computer-readable media and computer-usable media may provide non-volatile storage of data, data structures, computer-executable instructions, and the like.

A number of modules can be stored in the storage device 71 and in the volatile memory 68, including an operating system and one or more program modules which may implement the functionality described herein in whole or in part. All or a portion of the examples may be implemented as a computer program product 72 stored on a transitory or non-transitory computer-usable or computer-readable storage medium, such as the storage device 71, which includes complex programming instructions, such as complex computer-readable program code, to cause the processor device 60 to carry out the steps described herein. Thus, the computer-readable program code can comprise software instructions for implementing the functionality of the examples described herein when executed on the processor device 60.

As noted above, the powered circuitry 56 may include downstream QAM and OFDM modulators, upstream QAM and OFDM demodulators, and pseudowire logic used to connect to a CCAP Core. The powered circuitry 56 may be operable to convert downstream DOCSIS data, MPEG video, and out-of-band (OOB) signals received from a CCAP Core over a digital fiber network such as Ethernet or passive optical network (PON) to analog RF for transmission over the coaxial cable; and to convert upstream RF, DOCSIS, and OOB signals received over the coaxial cable to digital for transmission over Ethernet or PON to a CCAP Core. The FTD 52-1 includes one or more coaxial connectors 54 and one or more fiber connectors 55.

Individuals will recognize improvements and modifications to the preferred examples of the disclosure. All such improvements and modifications are considered within the scope of the concepts disclosed herein and the claims that follow.

What is claimed is:

1. A system comprising:

a first fiber-to-coaxial tap device (FTD) comprising:

a first housing;

a first plurality of coaxial connectors, the coaxial connectors operable to be communicatively coupled to corresponding ones of a first plurality of subscriber cable modems via a corresponding plurality of drop coaxial cables;

a first fiber connector operable to be coupled to a fiber node via a first fiber cable; and first processing circuitry within the first housing and operable to:

receive, via each coaxial connector of the first plurality of coaxial connectors, first analog radio frequency (RF) signals originating from a corresponding originating subscriber cable modem;

demodulate the first analog RF signals to generate first digital data;

generate first digital packets comprising the first digital data, wherein the first digital packets include a first source address that corresponds to the corresponding originating subscriber cable modem; and transmit the first digital packets to the fiber node via first digital optical signals.

2. The system of claim 1 wherein the first processing circuitry is further operable to:

receive, from the fiber node, a digital packet addressed to a first subscriber cable modem of the first plurality of subscriber cable modems;

convert the digital packet addressed to the first subscriber cable modem to second RF signals; and transmit the second RF signals to the first subscriber cable modem.

3. The system of claim 2 wherein the second RF signals are sent only to the first subscriber cable modem of the first plurality of subscriber cable modems.

4. The system of claim 1 further wherein each subscriber cable modem of the first plurality of subscriber cable modems is located in a separate parcel of land of a plurality of parcels of land, and wherein the first FTD is located on one of the parcels of land of the plurality of parcels of land.

5. The system of claim 1 wherein:

the first FTD comprises a plurality of fiber connectors, each fiber connector operable to be coupled to the fiber node via ones of a plurality of fiber strands of the first fiber cable; and the first processing circuitry is further operable to utilize, for each respective subscriber cable modem of the first plurality of subscriber cable modems, a particular fiber strand of the plurality of fiber strands for all communications originating from or destined to the respective subscriber cable modem.

6. The system of claim 1 wherein the first processing circuitry is further operable to:

concurrently receive, via each coaxial connector of the first plurality of coaxial connectors, second RF signals originating from ones of the first plurality of subscriber cable modems;

convert the second RF signals to second digital packets, wherein each second digital packet includes a source address that corresponds to the corresponding subscriber cable modem; and transmit the second digital packets to the fiber node via second optical signals.

7. The system of claim 6 wherein the first processing circuitry is further operable to transmit the second digital packets to the fiber node via the second optical signals concurrently using different wavelengths.

8. The system of claim 1 wherein the first FTD comprises a device that complies with a DOCSIS 3.0, DOCSIS 3.1, or DOCSIS 4.0 specification.

9. The system of claim 1 wherein the first processing circuitry comprises a quadrature amplitude modulation (QAM) and/or orthogonal frequency-division multiplexing (OFDM) modulator, and a QAM and/or OFDM demodulator.

10. The system of claim 1 wherein the plurality of drop coaxial cables is coupled to the first FTD directly without any splitter or amplifier between the first FTD and the corresponding subscriber cable modems.

11. The system of claim 1 further comprising:

a plurality of FTDs including the first FTD, each FTD comprising:

a second housing;

a second plurality of coaxial connectors, the coaxial connectors operable to be communicatively coupled to corresponding ones of a second plurality of subscriber cable modems via a corresponding second plurality of drop coaxial cables;

a second fiber connector operable to be coupled to the fiber node via a second fiber cable; and second processing circuitry within the second housing and operable to:

receive, via each coaxial connector of the second plurality of coaxial connectors, second analog RF signals originating from a second corresponding originating subscriber cable modem;

convert the second analog RF signals to second digital packets, wherein each second digital packet includes a second source address that corresponds to the second corresponding subscriber cable modem; and transmit the second digital packets to the fiber node via second digital optical signals.

12. A method comprising:

receiving, at a fiber-to-coaxial tap device (FTD) comprising a housing and a plurality of coaxial connectors communicatively coupled to corresponding ones of a plurality of subscriber cable modems via a corresponding plurality of drop coaxial cables, by circuitry inside the housing via each coaxial connector of the plurality of coaxial connectors, first analog radio frequency (RF) signals originating from a corresponding originating subscriber cable modem, wherein the FTD is communicatively coupled to a fiber node via a fiber cable;

demodulating, by the FTD, the first analog RF signals to generate first digital data;

generating, by the FTD, first digital packets comprising the first digital data, wherein the first digital packets include a first source address that corresponds to the corresponding originating subscriber cable modem; and transmitting, by the FTD, the first digital packets to the fiber node via digital optical signals.

13. The method of claim 12 further comprising:

receiving, from the fiber node, a digital packet addressed to a first subscriber cable modem of the plurality of subscriber cable modems;

converting the digital packet addressed to the first subscriber cable modem to second RF signals; and transmitting the second RF signals to the first subscriber cable modem.

14. The method of claim 12 further comprising:

concurrently receiving, via each coaxial connector of the plurality of coaxial connectors, second RF signals originating from ones of the plurality of subscriber cable modems;

converting the second RF signals to second digital packets, wherein each second digital packet includes a second source address that corresponds to the corresponding subscriber cable modem; and transmitting the second digital packets to the fiber node via second optical signals.

15. The method of claim 14 further comprising transmitting the second digital packets to the fiber node via the second optical signals concurrently using different wavelengths.

* * * * *